July 23, 1963 P. W. KAO ETAL 3,098,764
ANNULAR TRACK MEMBER FOR A SPINNING CYLINDRICAL PIPE
CORE DURING INTERIOR LINING OPERATION
Filed July 31, 1961 4 Sheets-Sheet 1
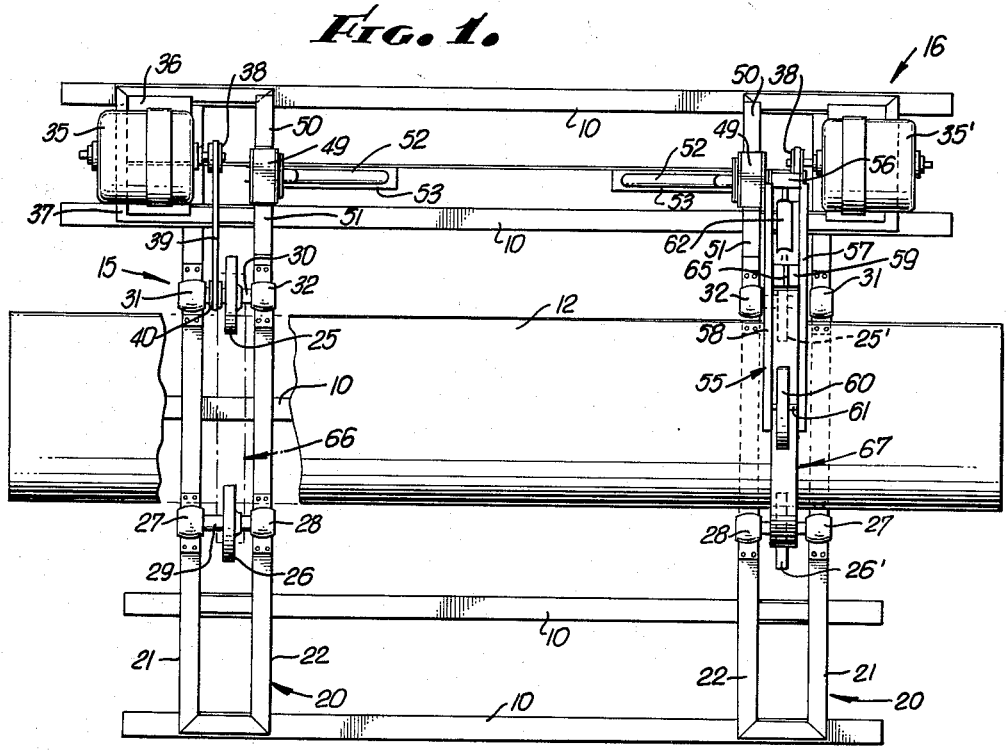
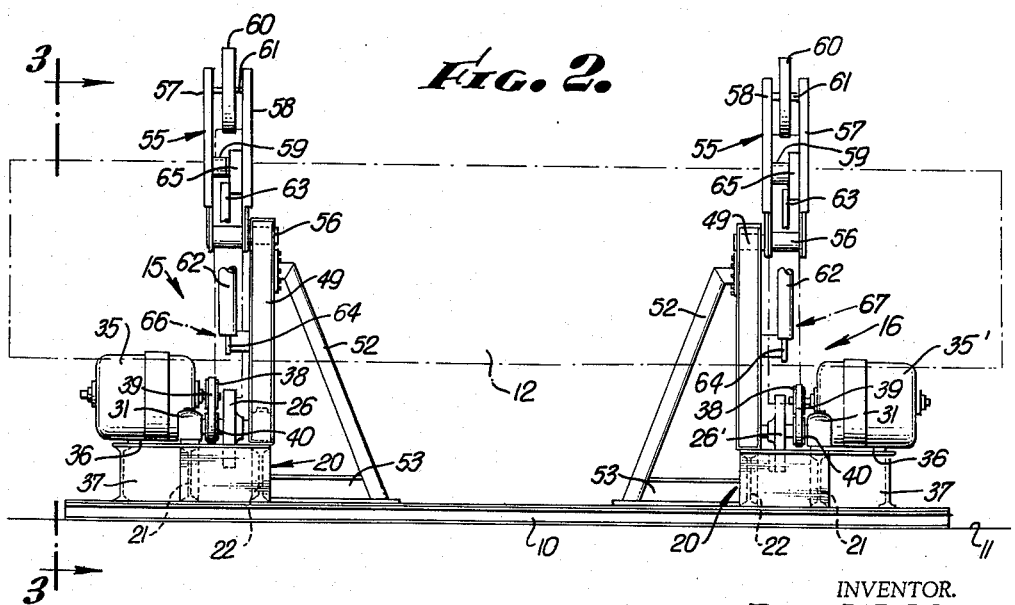
INVENTOR.
PAUL W. KAO
BY CHARLES H. BRANNEN
Boehler & Shanahan
ATTORNEYS.

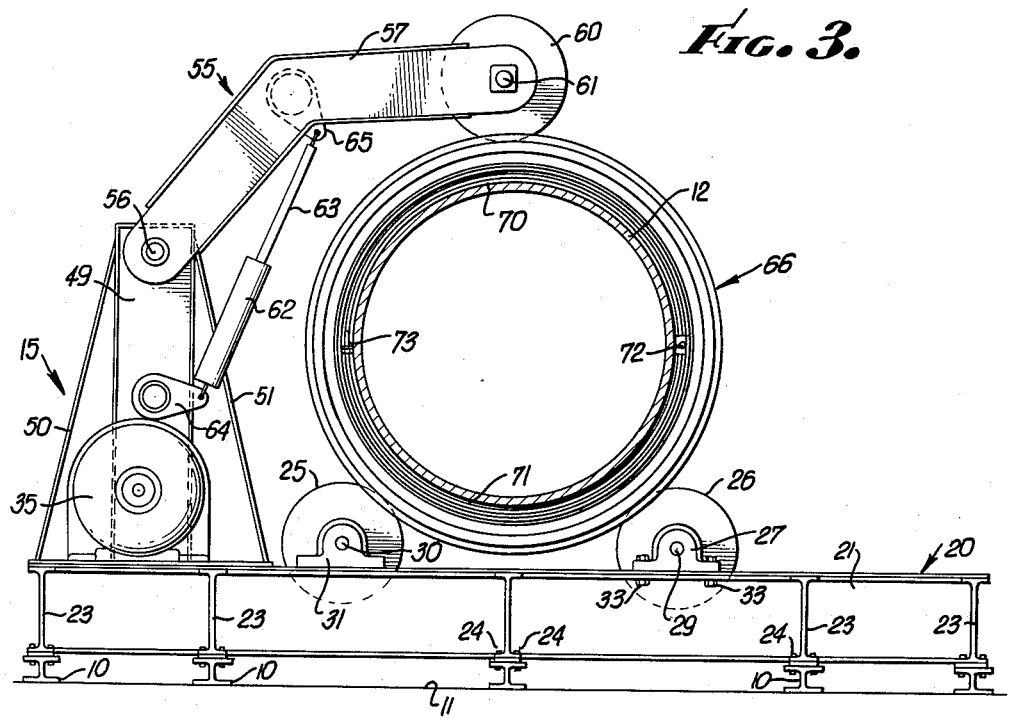

July 23, 1963
P. W. KAO ETAL
3,098,764
ANNULAR TRACK MEMBER FOR A SPINNING CYLINDRICAL PIPE
CORE DURING INTERIOR LINING OPERATION
Filed July 31, 1961
4 Sheets-Sheet 3
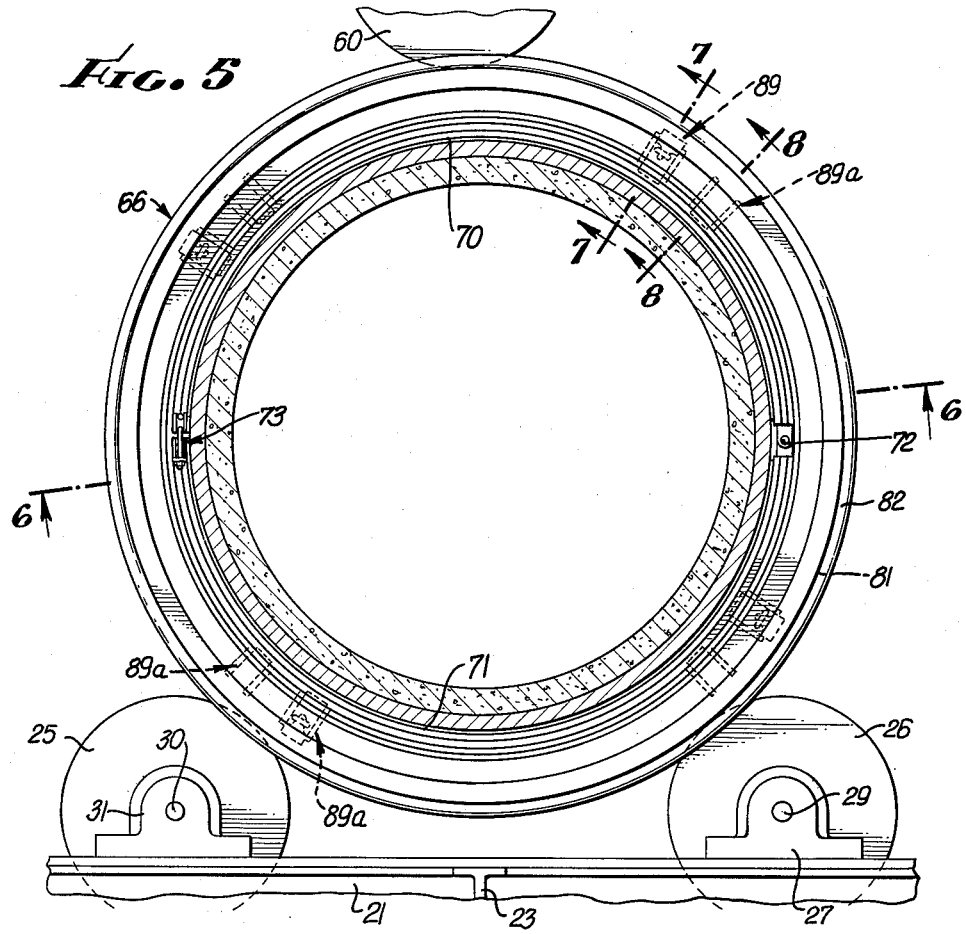
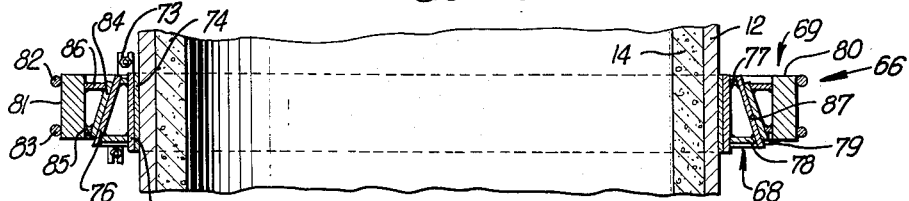
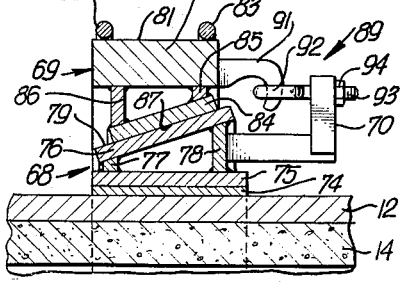
INVENTORS
PAUL W. KAO
BY CHARLES H. BRANNEN
Beehler & Shanahan
ATTORNEYS.

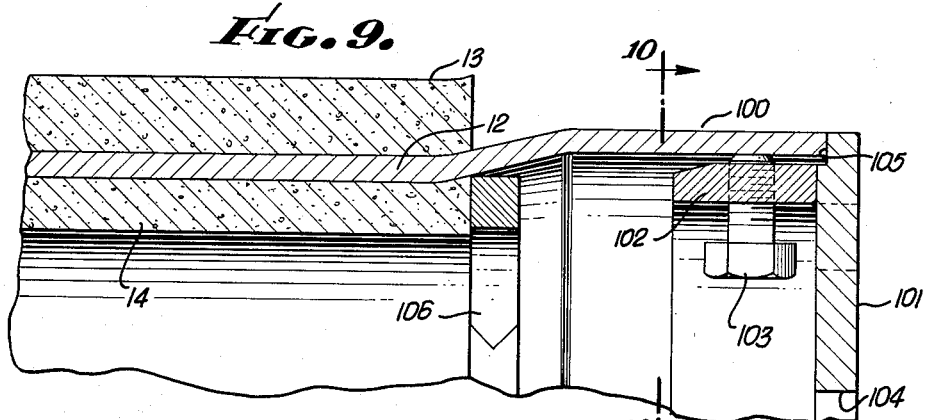
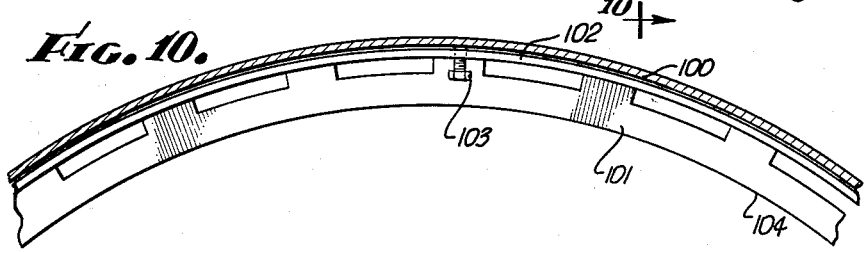
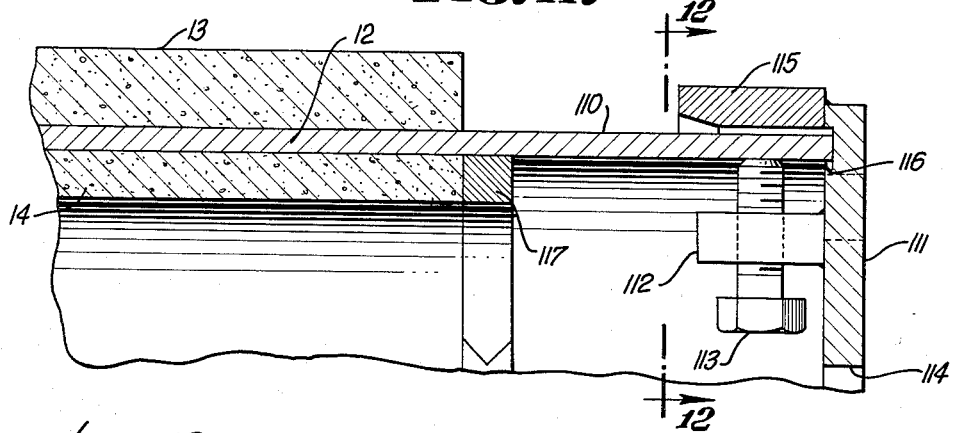
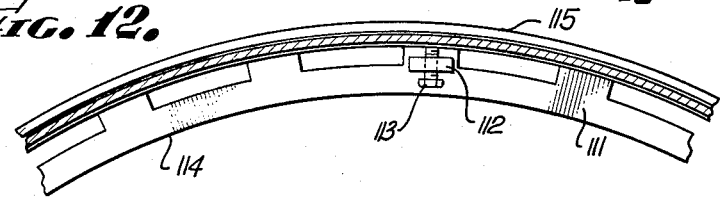
INVENTORS.
*PAUL W. KAO*
BY *CHARLES H. BRANNEN*
*Beehler & Shanahan*
ATTORNEYS.

United States Patent Office 3,098,764
Patented July 23, 1963

3,098,764
ANNULAR TRACK MEMBER FOR A SPINNING CYLINDRICAL PIPE CORE DURING INTERIOR LINING OPERATION
Paul W. Kao, Bakersfield, and Charles H. Brannen, Lockeford, Calif., assignors to Cen-Vi-Ro Pipe Corporation, Shafter, Calif., a corporation of California
Filed July 31, 1961, Ser. No. 128,163
7 Claims. (Cl. 118—55)

The invention relates to method and means for spinning pipe cores and has particular reference to a method and appropriate machine by means of which pipe cores of exceptionally large diameter and great length can be mounted and spun with a maximum amount of inert stability for as long as may be necessary to apply a plastic lining of appreciable thickness on the inside surface during the spinning operation, the resulting application of lining being sufficiently firm to permit the lined core to be handled and removed from the machine without prospect of damaging the lining even though it may not have been retained in the machine long enough to set.

There are certain types of pipe of exceptionally large diameter which in order to preserve a degree of economy in their manufacture and use are constructed only partially of iron or steel with the iron or steel forming a core which is lined on the inside with a plastic of the nature of a concrete grout for the purpose of giving to the iron core, which is of relatively light gauge, sufficient strength, mass, and insurance against deterioration, so that the finished product can be installed in trenches with sufficient ease, and there connected up one length with another for the purpose of conducting drinking water, irrigation water, and other fluids in considerable volume over long periods of time, and without the need for replacing sections of the resulting pipe which might deteriorate as the result of corrosion or other adverse conditions. At the present time, pipes of the construction indicated have been virtually the only type of pipe which falls within real economical bounds for the purpose described. When steel or iron cores are formed in such large sizes, they cannot be cast or rolled to close tolerances, nor can they be formed on the exterior with any appreciable degree of smoothness, nor without the presence of a camber along the outside surface. Steel and iron cores of such large diameter, furthermore, cannot readily be cast or rolled in perfect balance, nor in perfect concentricity. Therefore, when cores of such magnitude, weight, and mass need to be spun to make possible an even and continuous application of concrete grout to the interior, great difficulties are encountered in avoiding vibration, resonance, and shaking due to unbalanced or eccentric rotation, and other disturbances such as have the effect of disturbing the layer of moist concrete grout which is applied to the interior surface and sometimes knocking it entirely loose. Moreover, if because of the inability to effectively mount the core free of vibration and disturbances during spinning, the concrete grout falls from the interior surface and collects on one side, the resulting gyrations of the spinning pipe wherein its interior load becomes completely unbalanced is sufficient to cause the immense mass of material including the core and the accumulated grout to be torn from its mountings, and on some occasions, to completely wreck the machinery designed to hold and rotate it.

It is, therefore, among the objects of the invention to provide a new and improved method and means of effectively balancing a pipe core for a spinning operation in such fashion that the core can be rotated rapidly and smoothly without the presence of vibrations and disturbances which would otherwise impair the proper application of plastic to the interior surface.

Another object of the invention is to provide a new and improved method and means of mounting auxiliary traction bands on the exterior of pipe cores which are designed to be spun rapidly during the lining of the interior, the bands being of such character as to compensate for irregularities and inequalities in the core and which at the same time are adjustable one part with respect to the other, so that there is always present a linearly continuous circumference of fixed diameter which has a smooth surface, and which can be used as a traction surface during the spinning of the core for the application of the coating.

Still another object of the invention is to provide a new and improved machine for the mounting and spinning of pipe cores during inside lining operations, which can be quickly and easily adjusted in all respects to accommodate pipe cores of widely varying lengths and widely varying diameters without the need for making any appreciable changes in the machinery or the mechanical drive therefor, or of the means for stabilizing the cores when mounted on the machine during the spinning.

Still another object of the invention is to provide a new and improved machine for the spinning of pipe cores during inside coating operations, the parts of which are simple and easy to apply to the pipe core, and which at the same time are of such character that they can be easily removed after the coating operation has been completed, thereby to substantially minimize the time consumed in passing pipe cores to and from the machine for the spinning operation.

Also included among the objects of the invention is to provide a method and means for spinning pipe cores for inside lining operations, which is such that the pipe cores can be quickly equipped and mounted in the machine, and which can be removed therefrom with equal speed, thereby to greatly reduce the time of the operation and the attendant cost, and which at the same time provides adequate insurance against troublesome failures which might otherwise greatly damage the machinery or render it unserviceable for appreciable lengths of time.

With these and other objects in view, the invention consists in the construction, arrangement and combination of the various parts of the device, whereby the objects contemplated are attained, as hereinafter set forth, pointed out in the appended claims and illustrated in the accompanying drawings.

FIGURE 1 is a plan view of a machine with which the method can be practiced;

FIGURE 2 is a side elevational view of the machine shown in FIGURE 1;

FIGURE 3 is an end elevational view taken on the line 3—3 of FIGURE 2;

FIGURE 4 is a fragmentary plan view of one end of the machine equipped especially for the spinning of concrete cores;

FIGURE 5 is a fragmentary end elevational view of a pipe core mounted upon the machine;

FIGURE 6 is a fragmentary longitudinal sectional view taken on the line 6—6 of FIGURE 5;

FIGURE 7 is a fragmentary longitudinal sectional view taken on the line 7—7 of FIGURE 5;

FIGURE 8 is a fragmentary longitudinal sectional view taken on the line 8—8 of FIGURE 5;

FIGURE 9 is a fragmentary longitudinal sectional view of the bell end of the core showing the condition of the product after the coating has been applied both to the exterior and to the interior;

FIGURE 10 is a fragmentary cross-sectional view taken on the line 10—10 of FIGURE 9;

FIGURE 11 is a fragmentary longitudinal sectional view of the spigot end of a core after application of coating to the interior and exterior; and FIGURE 12 is a fragmentary cross-sectional view taken on the line 12—12 of FIGURE 11.

As shown in the drawings, a pipe core is adapted to be mounted upon a pair of rollers at each end so that the core is free to rotate, while an upper stabilizing roller holds the core in place. Power is supplied to one of the lower rollers for rotating the core. Actually bands are applied to the core as suggested in FIGURE 1 adjacent the opposite ends so that in fact the bands rest upon and travel with respect to the circumferences of the supporting wheels, rather than having the wheels in direct contact with the core, especially when the core is a steel core. There is a friction drive from one of the supporting rollers to the respective band, thereby to cause the core to spin at a relatively rapid rate in response to operation of an electric motor at each end. The pair of wheels at each end are carried by an adjustable carriage unit, and these units can be shifted endwise to accommodate pipe cores of different lengths. Also one of the supporting wheels can be moved toward and away from the other supporting wheel in order to accommodate cores of different diameters. There is also possible an adjustment in the stabilizing wheel at the top so that this can be moved up or down depending on the diameter of the core.

In an embodiment chosen for the purpose of illustration, such, for example, as the machine shown in the drawings and already referred to, there is provided a bed frame which in this embodiment is constructed of a series of longitudinally extending rails 10, spaced apart as indicated in FIGURES 1 and 3, and fastened to an appropriate supporting surface 11. These rails may extend throughout any length depending upon the length of a pipe core 12 which is often of steel or iron, but which may on occasion be one of concrete, or an iron core coated on the exterior with a layer of concrete 13, prior to the spinning and lining of the interior with a lining 14 of concrete grout or other appropriate plastic material. In practice the core 12 is often identified as a steel cylinder.

As clearly shown in FIGURES 1, 2, and 3, there are provided two pipe core supporting and rotating units indicated generally by the reference characters 15 and 16 at respectively opposite ends of the core 12. The units are right hand and left hand units in the particular embodiment chosen for the purpose of illustration, but are otherwise substantially the same in their construction, mounting, and operation. Hence, the separate parts herein indicated by reference as applying to the unit 15 are equally applicable to the unit 16.

In the unit 15, therefore, by way of example, there is shown a transversely extending supporting beam 20 which may be of open framework consisting of a pair of I-beams 21 and 22 connected together by transversely extending gusset elements 23 (see FIG. 3), all welded together one with respect to the other in a substantially conventional fashion. The supporting beam in each instance may be attached to the bed frame by a series of bolts 24 in a releasable fashion so that when occasion requires, the bolts can be removed and the beam 20 shifted longitudinally along the rails of the bed frame to various positions, at different distances one unit with respect to the other when cores of longer or shorter lengths are to be accommodated.

Mounted upon each unit is a pair of supporting wheels 25 and 26. The wheel 25 is a drive wheel, and the wheel 26 is an idler wheel in the embodiment shown. The wheel 26 is carried by a pair of pillow blocks or bushings 27, 28 in which are suitable bearings for mounting a shaft 29 on which the wheel 26 is carried. Similarly, the wheel 25 is mounted upon a shaft 30 which in turn is rotatably supported in appropriate bearings carried by pillow blocks or bushings 31 and 32 mounted respectively on the I-beams 21 and 22. The pillow blocks 31 and 32 are preferably anchored or fixed in position upon the beam 20 through the respective I-beams. Contrarily, the pillow blocks 27 and 28 are releasably secured to the respective I-beams as by means of bolts 33 so that when the wheel is to be shifted toward or away from the wheel 25, the bolts may be removed and the pillow blocks anchored in a new place or further away as the case may be by use of the same bolts.

A motor 35 is secured to a lock 36 which in turn is carried by a lateral extension 37 of one of the gussets 23. A drive sprocket or pulley 38 on the motor is connected by means of a chain drive to a driven sprocket or pulley 40 on the shaft 30 which supports the wheel 25 making the wheel 25 a friction drive wheel. Accordingly, there is a direct drive from the motor 35 to the wheel 25 of the pipe core supporting and rotating unit 15.

In the interest of clarity, reference is made to a motor 35' mounted upon the pipe core supporting and rotating unit 16 at the opposite end which is adapted through a similar drive train to rotate a drive wheel 25'. Since these are two entirely different sources of power, operating at opposite ends of a pipe core of considerable length, it is necessary that they be synchronized and driven at precisely the same speeds. To accomplish this, the motors 35, 35' selected for this purpose may be D.C. motors served by a common source of power through a conventional electrical synchronizing system well known in the art and available for purposes of the kind herein described.

When the pipe core 12 is a steel core, it is customary to employ wheels 25, 26, 25', 26' constructed of steel. On those occasions where the core might consist of a concrete core or a core having superimposed thereon a concrete coating 13 as suggested in FIGURES 9 and 11, there may be attached to the shaft 29 pneumatic tire wheels 45 and 46. Similarly, pneumatic tire wheels 47 and 48 may be mounted upon the shaft 30 without in either instance it being necessary to disturb the mounting or location of the respective steel wheels 25 and 26. The pneumatic tire wheels 45, 46, 47, and 48 are spaced apart in pairs as shown and at the locations indicated in FIGURE 4. They provide a well balanced support for the pipe core and engage the concrete coating with a cushioned support, thereby making it possible to rotate a core of this kind smoothly and easily without undesirable vibration or unbalance.

At a location adjacent the motor 35 on the unit 15, there is provided a column 49 having appropriate braces 50 and 51 for supporting it firmly upon the beam 20 at its position adjacent the motor 35. A brace 52 extends from an upper portion of the column 49 downwardly where it is attached to an extension plate 53 forming a part of the unit 15.

A stabilizer arm 55 is mounted at the top of the column 49 by employment of a pivot shaft 56 so that the stabilizer arm can rotate or pivot about the axis of the shaft 56 to various positions. The stabilizer arm consists of a pair of arm members 57 and 58 on opposite sides secured together by means of connecting plates 59, as well as being connected in effect by virtue of the arm members being attached to respectively opposite sides of the pivot shaft 56, and there appropriately anchored by well known means.

At the uppermost extremity of the stabilizer arm, there is provided a stabilizer wheel 60 which is rotatably attached to the arm members by employment of a shaft 61. The stabilizer wheel 60 is preferably a steel wheel similar in all material respects to the wheels 25 and 26.

In order to tilt the stabilizer arm 55 up and down as the case may arise, both to remove the stabilizer wheel 60 out of the way when the machine is to be loaded, as well as to bear upon the core after the core is in place, there is provided a hydraulic cylinder 62 operating with a piston rod 63 in a well known fashion. The cylinder 62 is movably attached to a bracket 64 which in turn is mounted upon the column 49. The piston rod is secured to a bracket 65 in a movable manner, the bracket 65 in turn being attached to the stabilizer arm 55 midway between opposite ends so that the piston rod and its point of connection effectively clear any pipe core which might be used in the machine.

To make allowance for sundry variations in the pipe core 12, there are provided annular track members 66 and 67 adjacent opposite ends of the core 12. The track members, although used on opposite ends of the core, are substantially the same in design and construction sufficient that the description of one will suffice for both. Each track member consists of an inner anchoring band 68 and an outer traction band 69. The bands are entirely separate members although adapted to be assembled into engagement with each other for purposes of operation.

The inner anchoring band includes two arcuate segments 70 and 71 as indicated in FIGURES 3 and 5. The segments are pivotally attached together by means of a pivot pin 72 and at opposite ends have a releasable bolted connection 73. Other than the complementary segments, each in turn is constructed substantially identically one with respect to the other. In each instance, the segment includes an arcuate shoe 74 to which is attached a second arcuate ring section 75. Mounted upon the ring section 75 is an arcuate adjusting ring section 76 which by employment of spacers 77 and 78 cause the adjusting ring to be mounted in the sloped relationship shown in FIGURES 7 and 8, thereby presenting an outwardly facing positioning surface 79.

The traction band 69 rather than consisting of articulated segments like the band 68 instead is a circumferentially continuous band. The band 69 consists of a circumferentially continuous traction ring 80 having a smooth circumferentially continuous outwardly facing traction surface 81. Guard rings 82 and 83 may be provided at opposite edges of the traction surface to limit the extent of the traction surface and its engagement with the wheels in operation.

A circumferentially continuous positioning ring 84 is tiltably attached to the traction ring 80 by means of spacers 85 and 86 of unequal height so that the positioning ring 84 is sloped at substantially the same angle of slope as the adjusting ring sections 76 already described. An inwardly facing positioned surface 87 of the positioning ring 84 actually engages the surface 79 in a sliding relationship during assembly of the sundry parts.

When the track members are applied to the core at the opposite ends, it is desirable and advisable to first attach the segments 70 and 71 of the anchoring band 68 to the exterior surface of the core 12. In practice the outside diameter of the steel cylinder which comprises the core 12 is not perfect and in the sizes here under consideration is permitted a mill tolerance of minus nothing plus .250 inch. Under these circumstances, the outside diameter of the core could on occasions vary as much as one-quarter inch from the nominal specified outside diameter. Furthermore, these pipes may differ in size by as much as one inch on occasions, and this difference needs also to be accommodated. Further still, thick steel cylinders of the type here under consideration vary in chamber from end to end and this is a further factor which needs to be balanced and accommodated. There may further be a difference in wall thickness sufficient to unbalance the core to a slight extent. When the concrete grout is applied progressively to the interior surface, there will also be a temporary unbalance, and a permissive roughness in the exterior surface has the effect of producing unwanted vibrations, should the surface of the core be depended upon for a traction surface.

The troublesome effects of all of these variations and undesirable factors are eliminated by employment of the track members herein disclosed and described. Accordingly, the anchoring band, when it is attached directly to the exterior surface of the core, substitutes for the core as a means upon which to mount the traction band. After the anchoring band has been secured in place by employment of the bolted connection 73, the traction band 69 is applied. This is accomplished by sliding the traction band over the end of the core until it is positioned around the anchoring band in the relationship indicated in FIGURES 7 and 8 where the inwardly facing positioning surface 87 slides into contact with the outwardly facing positioning surface 79. Irrespective of the final outside diameter of the adjusting ring sections 76 which will be varied to a degree by the dimensions of the pipe to which the anchoring band is applied, the traction band can be properly connected. The sloping wedge-like effect between the obliquely positioned rings or ring sections 76 and 84 will make the contact good whether the diameter of the composite ring 76 is slightly greater or slightly less than that normally encountered. It merely means that the positioning ring 84 will slide up along the opposite surface to a greater or lesser degree.

In order to securely anchor the respective bands 68 and 69 in position, there are provided a series of clamps 89, 89a. Although clamps slightly different in character are shown, they may be, if desired, identical. The clamp 89 consists of a bracket 90 on the spacer 78 and a hook 91 on the traction ring 80. A screw eye 92 receives the end of the hook and a threaded shank 93 extending through the bracket 90 is provided with a nut 94 which can be screwed up in order to draw the traction band 69 firmly against the anchoring band 68, as clearly shown in FIGURE 7. The parts shown for the clamp 90 in FIGURE 8 are substantially similar except that in place of the screw eye, there may be provided a cylinder 95 with which a piston 96 co-operates, the piston 96 being provided with an eye 97 receptive of the hook 91. The cylinder may be supplied with a suitable fluid under pressure whereby to draw the piston 96 inwardly in order to clamp the bands together. For releasing the bands in the instance of either clamp 89 in FIGURE 7, or 90 of FIGURE 8, the reverse operation is resorted to.

The positioning surfaces 79 and 87 herein referred to are machined surfaces and provide a very smooth working contact. The traction surface thus mounted and presented to the wheels provides a rotating surface which permits of a rotation of as much as 8000 feet per minute in a manner which inhibits vibration and bouncing, and which is sufficient to substantially minimize any likelihood of shaking loose the application of concrete grout to the interior of the core surface when it is applied. In practice, the weight of the arcuate shoe 74, the adjusting ring section 76, the positioning ring 84, the traction ring 80, and the sundry attachments which are mounted thereon and which constitute the removable traction ring assembly at each end has a weight which is approximately equal to the weight of the core 12. For a core seven feet in diameter and forty feet long, the aggregate weight of the rings for example may be approximately eight tons.

When, for example, a core is to be accommodated which is substantially smaller in diameter than the relative diameter of the core shown in FIGURE 3, it is advisable to move the wheel 26 inwardly toward the wheel 25 at a distance sufficient to have the lowermost portion of the core at about the same level as the lowermost portion of the core 12 as shown in FIGURE 3. The reason for this lies primarily in maintaining the relative position of the core substantially the same so that equipment normally provided for charging the concrete grout into the interior of the pipe need not be altered or readjusted. It is, of course, necessary to keep all rotating parts above the upper level of the beams 20. When the core of smaller diameter is to be accommodated, the stabilizer wheel 60 is moved downwardly into engagement with the top of the core of smaller diameter by manipulation of the cylinder 62. The stabilizer wheel 60, in addition to being in circumferential alignment with the wheels 25 and 26, will also be more or less midway between them at the top of the core. The stabilizer wheel 60 rides upon the traction surface 81 in the same manner as the wheels 25 and 26 ride upon the traction surface. Moreover, the guard rings 82 and 83 serve the purpose of preventing walking of the pipe core in one direction or another out of its intended position of operation.

Conversely, should a core of larger diameter need to be accommodated, the wheel 26 will be moved outwardly away from the wheel 25 a distance appropriate to the locating of the lowermost portion of the core of larger diameter at about the same level as the lowermost portion of the core 12 in FIGURE 3. Conversely, by manipulation of the cylinder 62 the stabilizer wheel will be elevated a distance sufficient to accommodate the core of larger diameter. The relative location, however, of the stabilizer wheel 60 will continue substantially the same with respect to the wheels 25 and 26. It is merely necessary to provide traction members 66 and 67 of such larger diameter as will fit upon a core of larger diameter or of such smaller diameter as will fit the core of smaller diameter. In either event the permissive tolerances and variations made reference to in connection with the core 12 is accommodated in the same fashion for cores of either larger or smaller diameter. Difference in length of the core, as has already been noted, is allowed for by making possible the shifting of one or both of the units 15 or 16 lengthwise with respect to the core. In all instances, synchronization of the motors 35, 35' will assure steady uniform vibration at both ends of the core so that the lining of the core can continue undisturbed until completion.

Because of the rapid spinning in a smooth working mounting of the type herein described when the grout is applied to the interior, the lining will even out over the entire circumference and become firmly packed in a position adhering to the interior. After the rotation has been stopped, therefore, the interiorly lined core can be released from the machine and lifted and moved therefrom by appropriate means preparatory to the mounting of another core in place for a repetition of the operation and method.

To further assure a firmness in the mounting of the core 12, for the practice of the method as hereinabove described, flanges may be applied to opposite ends as indicated in FIGURES 9, 10, 11, and 12. At a bell end 100, there is provided an annular flange 101 having an inwardly facing lug ring 102 thereon in which are bolts 103, which threadedly engage the ring and can be advanced into contact with the interior surface of the bell end 100 at the various locations around the circumference. The bolts can be reached by passing a wrench through the open end 104 of the flange 101. The ring 102 may preferably consist of one continuous lug ring extending entirely around the circumference, and a step 105 on the inside face of the flange 100 may also be provided to assist in positioning the flange upon the bell end. A split screed ring 106 of square cross section, ample in dimension, may be sprung in position at the base of the bell end so as to limit the spread of the lining material 14 when it is applied. Because of the split character of the ring 106, it can be readily removed after the lining material has achieved an initial set.

At the opposite end of the pipe there is a spigot end which is equipped similarly by employment of a flange 111 having lugs 112 on its inside surface. Suitable bolts 113 have a threaded engagement through the lugs and may be extended into engagement with the inside surface of the bell end 110. Access is had to the bolts through open end 114 at the inside edge of the flange 111. To add further support there may be provided an exterior backing ring 115 attached to the flange 111 to brace the spigot end against expansion when the bolts are screwed tightly into position. A step recess 116 assists in positioning the flange upon the spigot end. Here also a split screed ring 117, square in cross section, may be sprung into position to define the location to which the lining material 14 can extend when it is applied.

By employment of flanges at the bell end and spigot end, as shown and described, the core is reinforced considerably at these locations where neither grout lining nor any exterior coating is applied. Hence sufficient firmness will be established temporarily at these areas thereby to assist materially in being able to shift the newly lined or coated core into and out of position in the spinning machine as well as elsewhere, wherever it may be needed for final setting and curing.

When the lining material 14 is to be applied, the pipe core with the attached rings is rotated up to a full circumferential speed of about 8000 feet per minute. At this speed, the weight of the ring assemblies, attached as they are to the steel core and weighing as much as eight or more tons for the spinning of seven foot diameter pipe lengths, is creative of an appreciable fly wheel, gyro or stabilizing effect balanced as the ring assemblies are equidistant from the longitudinal center line of the pipe core. Because of the smooth riding effect built into the assembly, the stabilizing effect thus created at the speed mentioned is productive of a singular degree of stability at all times during operation. This means that when the wet concrete is dumped into the interior of the pipe it will spread rapidly as the pipe spins around and also even though there is a momentary unbalance when, for example, about five tons of aggregate is dumped into the interior of a seven foot pipe core, the gyro effect is so pronounced that there will be no troublesome vibration or unbalance during the dumping period of the cycle. In practice, for the deposition of the concrete mixture, conventional practice is followed wherein a trough substantially the same length as the length of the core is inserted endwise into the interior of the core and the trough is inverted dumping the concrete which is deposited simultaneously throughout the entire length of the interior.

Following the deposition of the concrete and withdrawal of such trough or other expedient as may have been employed to deposit it, the core is spun rapidly at the recommended speed for an appreciable length of time. This may vary from ten to twenty minutes more or less, depending upon the size of the pipe being handled. As the core and the lining material spins rapidly, the solid heavier aggregate and cement will be forced outwardly by centrifugal force into intimate engagement with the inside surface of the core and water used initially in mixing the aggregate and cement will find its way to the interior surface of the liner material. To rid the interior of excess moisture, a blower (not shown) is employed which blows a very appreciable volume of air under considerable pressure into the interior of the core. The blower begins operation at one end of the interior and advances progressively from the one end to the other as the core continues spinning rapidly and in this fashion the surplus water is moved along the interior of the liner material until it is ejected outwardly at the opposite end from which the blowing began. Once the surplus water has in this fashion been ejected and the liner material compacted by the rapid spinning at high speed for a considerable length of time, spinning can be stopped and the lined core can be lifted from the wheels 25 and 26 and the traction rings thereafter removed. The degree of compaction is such that the liner material remains firmly in place even though there is considerable rough handling and pounding upon the rings on the outside during the process of breaking them loose and removing them from the exterior.

The gyro stabilizing effect produced by the massive character of the rings under rapid rotation is further of material help when it becomes advisable to vibrate the core during rotation by employment of substantially conventional exterior vibrators acting upon the outside surface of the core in order to further assist in compacting the liner material by centrifugal force created by the rapid rotation. Because of the possibility of vibrating during the depositing and rotation of the liner material, dryer mortars may be used with the attendant advantages of a dry mix such for example as reducing segregation of the aggregate. This is in marked contrast to the limitations inherent in the use of extremely moist mixes which are customary in more conventional lining methods.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In a pipe core spinning machine a pair of core supporting wheels, an annular track member adapted to be releasably mounted on the exterior circumference of a pipe core comprising an anchoring band and a traction band, said anchoring band comprising arcuate segments releasably secured together and adapted to anchor to the exterior of the core, said traction band comprising a circumferentially continuous traction surface adapted to engage the wheels, an inwardly facing positioning area on the traction band and an outwardly facing positioning area on the anchoring band, said positioning areas having a shiftable engagement with respect to each other, and mutually engaging connecting means having elements on the respective bands adapted to force said bands into engagement whereby to provide a firm, smooth rolling surface between said core and said wheels.

2. In a pipe core spinning machine comprising a frame, at least one pipe core supporting and rotating unit on said frame comprising a support, a pair of core supporting wheels rotatably mounted on the support at locations spaced radially from each other for reception of the core thereon, motor drive means for the wheels, an annular track member releasably mounted on the exterior circumference of said core at positions in radial alignment with the wheels, said track member comprising an anchoring band and a traction band, said anchoring band comprising arcuate segments releasably secured together and adapted to anchor to the exterior of the core, said traction band comprising a circumferentially continuous traction surface adapted to engage the wheels, an inwardly facing positioning area on the traction band and an outwardly facing positioning area on the anchoring band, said positioning areas having a shiftable moving engagement with respect to each other, and mutually engaging connecting means having elements on the respective bands adapted to force said bands into engagement whereby to provide a firm, smooth rolling surface between said core and said wheels.

3. In a pipe core spinning and inside coating machine in which core supporting wheels support and spin said core, an annular track member for mounting on the core in rolling engagement with said wheels, said annular track member comprising an inner anchoring band and an outer traction band, said anchoring band comprising arcuate segments adapted to be releasably joined together in an annular relationship, said segments having outwardly facing positioning surfaces, said traction band comprising a circumferentially continuous traction ring having an outwardly facing cylindrical traction surface adapted to engage said wheels, circumferentially continuous internal conical ring mounted on the inner side of said traction ring said internal conical ring being adapted to engage said outwardly facing positioning surfaces, and mutually engaging means on the respective bands holding said bands in engagement to form said annular track member, whereby said track member presents a smooth continuous circumferential track to said supporting wheels.

4. In a pipe core spinning machine in which a cylindrical pipe core is rotated on core-supporting wheels during the deposition of plastic material inside said core, a plurality of ring assemblies for mounting said core on said wheels, each of which ring assemblies includes: an anchoring band comprised of a plurality of connectable segments; tightening means for tightening said anchoring band around said core; an external conical wall on each of a plurality of said segments; a traction band in the form of a continuous ring adapted to be closely received on said anchoring band, said traction band having a circumferential traction surface adapted to engage said core-supporting wheels; an internal conical wall integral with said traction band, and adapted to mate with the external conical walls on said anchoring band segments; and a plurality of clamp means on said ring assembly for holding said mating conical surfaces in rigid telescoping engagement.

5. In a pipe core spinning machine in which a cylindrical pipe core is rotated on core-supporting wheels during the deposition of plastic material inside said core, a plurality of ring assemblies for mounting said core on said wheels, each of which ring assemblies includes: an anchoring band comprised of a plurality of connectable segments, and tightening means for tightening said anchoring band around said core; an external conical wall integral with each of said segments; a traction band in the form of a continuous ring adapted to be closely received on said anchoring band, said traction band having a circumferential traction surface adapted to engage said core-supporting wheels; an internal conical wall integral with said traction band, and adapted to mate with the external conical walls on said anchoring band segments; and a plurality of clamp means on said ring assembly, each of said clamping means including means for pulling and holding said anchoring band and said traction band in a direction parallel with their common axis, to slide said mating interior and interior conical surfaces with respect to each other in a direction longitudinal to said core into a rigidly clamped running position.

6. In a pipe core spinning machine in which a cylindrical pipe core is rotated on core-supporting wheels during the deposition of plastic material inside said core, a plurality of ring assemblies for mounting said core on said wheels, said ring assemblies having a combined weight not less than the weight of said pipe core, and among which two of said ring assemblies include: an anchoring band comprised of a plurality of connectable segments; tightening means for tightening said anchoring band around said core; an external conical wall integral with each of said segments; a traction band in the form of a continuous ring adapted to be closely received on said anchoring band, said traction band having a circumferential traction surface adapted to engage said core-supporting wheels; an internal conical wall integral with said traction band, and adapted to mate with the external conical walls on said anchoring band segments; and a plurality of clamp means for holding said mating surfaces in non-slipping contact.

7. In a pipe core spinning machine in which a cylindrical pipe core is rotated on core-supporting wheels during the deposition of plastic material inside said core, a plurality of ring assemblies for mounting said core on said wheels, each of which ring assemblies include: an anchoring band comprised of a plurality of connectable segments; tightening means for tightening said anchoring band around said core; an external conical wall integral with each of said segments; a traction band in the form of a continuous ring adapted to be closely received on said anchoring band, said traction band having a circumferential traction surface adapted to engage said core-supporting wheels; an internal conical wall integral with said traction band, and adapted to mate with the external conical walls on said anchoring band segments; and a plurality of clamp means urged by fluid pressure to telescope said mating conical surfaces whereby said anchoring band and said traction band are held in rigid assembly during the spinning of said pipe core.

References Cited in the file of this patent

UNITED STATES PATENTS

| | | |
|---|---|---|
| 1,346,411 | Massey | July 13, 1920 |
| 1,536,682 | Moir et al. | May 5, 1925 |
| 2,108,371 | French | Feb. 15, 1938 |
| 2,161,968 | Lyons et al. | June 13, 1939 |
| 2,229,618 | Abeles et al. | Jan. 21, 1941 |
| 2,267,815 | Bush | Dec. 30, 1941 |
| 2,348,714 | Defiore | May 16, 1944 |
| 2,349,213 | Van Niekerk | May 16, 1944 |
| 2,602,979 | Van Buren | July 15, 1952 |
| 2,735,153 | Chanlund | Feb. 21, 1956 |
| 2,754,563 | Hartenstein | July 17, 1956 |
| 2,786,253 | Edwars | Mar. 26, 1957 |

FOREIGN PATENTS

| | | |
|---|---|---|
| 12,309 | Australia | Apr. 20, 1934 |

OTHER REFERENCES

Loving: Cen-Vi-Ro Reinforced Concrete Pressure Pipe, P.O. Box 295, Glenview, Ill., 1951 (pages 2, 3, 5, and 7 relied on). (Copy in Div. 15.)